United States Patent [19]

Gable

[11] 4,271,523

[45] Jun. 2, 1981

[54] CONTENTION INTERFERENCE DETECTION IN DATA COMMUNICATION RECEIVER

[75] Inventor: Melvin G. Gable, Ypsilanti, Mich.

[73] Assignee: Ford Motor Company, Dearborn, Mich.

[21] Appl. No.: 46,579

[22] Filed: Jun. 7, 1979

[51] Int. Cl.³ .......................................... H04Q 9/00
[52] U.S. Cl. ............................. 371/57; 340/147 LP; 340/147 SC; 371/56; 375/101
[58] Field of Search ..................... 371/55, 56, 57, 64; 375/17, 34, 101, 99; 340/147 LP, 147 SC; 455/8, 10, 63, 67

[56] References Cited

U.S. PATENT DOCUMENTS

| | | | |
|---|---|---|---|
| 3,343,125 | 9/1967 | Lender | 371/56 |
| 3,622,986 | 11/1971 | Tang et al. | 371/56 |
| 3,721,959 | 3/1973 | George | 371/8 |
| 3,747,065 | 7/1973 | Gibson | 371/56 |
| 3,760,277 | 9/1973 | Whang | 371/56 |
| 3,831,145 | 8/1974 | Mecklenburg et al. | 371/56 |
| 4,063,220 | 12/1977 | Metcalfe et al. | 340/147 LP |

*Primary Examiner*—Charles E. Atkinson
*Attorney, Agent, or Firm*—Peter Abolins; Clifford L. Sadler

[57] ABSTRACT

When a plurality of transmitters share a common communication medium or radio frequency channel, collision interference will result when two or more transmissions overlap in time. An interference detector apparatus is used to sense this simultaneous transmission. The use of code redundancy in transmitting data over the medium in conjunction with a code classifying decoder apparatus permits interference to be detected within the receiver. The interference detector signal interrupts its own transmitter or a plurality of transmitters, when collision interference is present on the medium. This truncation of transmission improves the channel capacity of the shared medium. The interference signal can also be used to inhibit a receiver from generating erroneous data during the interference duration.

5 Claims, 2 Drawing Figures

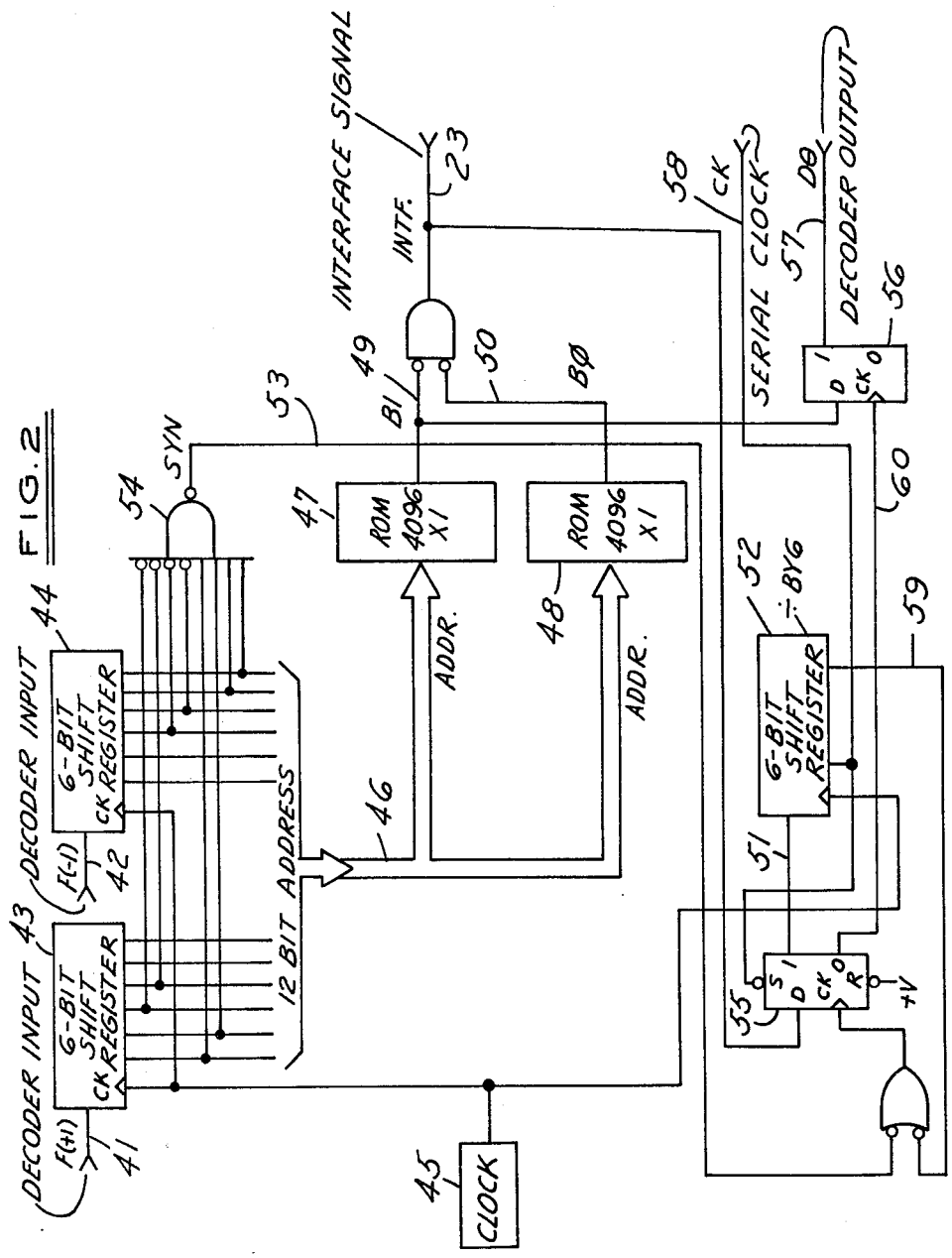

CONTENTION INTERFERENCE DETECTION IN DATA COMMUNICATION RECEIVER

BACKGROUND OF THE INVENTION

1. Field of the Invention

The present invention relates to multipoint data communication receiver which is used on a shared communication medium with a plurality of transceivers or transmitters.

2. Prior Art

With respect to prior art relating to interference detection, it is known to have a collection of transceivers, each of which is attempting to transmit over a shared communication channel. When two separate source transmissions overlap in part or completely they will interfere and destroy each other. When the communication channel is characterized with a propagation delay between any source and destination nodes as being relatively small with respect to that of the transmission time, then it is more efficient to sense if the channel is idle before attempting transmission. The transceiver should be able to listen to the channel through the use of a carrier detect signal. If the carrier signal is heard then the transmitter will realize that the channel is in use and will defer or postpone its transmission until the channel is sensed to be idle.

This property of carrier deference, does not guarantee channel acquisition. Two or more transceivers may detect the channel idle and attempt transmission. However, the detection of carrier from another transmitter may take the end-to-end propagation delay of the medium. Therefore, interference from multiple simultaneous transmissions may occur. The user transmitting determines that its previous transmission was unsuccessful due to the absence of a positive acknowledgement from the receiving node. It then reschedules its transmission of data.

Consider the case where the transceiver can listen to its own transmission and determine when interference exists. When interference is detected it could then truncate transmission and reduce the collision period. If the smallest transmitted element (bit) on which interference can be detected is less than the propagation time "Td" over the medium then the channel is guaranteed to be captured after this time "Td". However, the transceiver can only be assured of medium capture after twice the propagation delay which is the round trip time to sense collision. Once a user transmission has been in progress for the end-to-end propagation medium time, all transmitters will be deferred and the transmission will complete without collision.

Prior systems have performed this collision detection by the exclusive OR function on the modulated signal of the transmitter to that of the received signal by providing a delay substantially equal to the signal propagation delay through the transmitting and receive buffer circuits. This approach is described in U.S. Pat. No. 4,063,220 issued Dec. 13, 1977 entitled "Multipoint Data Communication System With Collision Detection". Such an apparatus for detecting collision on the modulated signal is very suceptible to phase-shifts and noise on the medium. This technique would probably not be suitable for a noisy environment. An alternative apparatus is required which would protect the data from noise but allow interference induced by multiple transmissions (similar signals with different phase) to be detected during transmission on the shared channel.

Modulation or encoding is the process by which digital data bits or analog signal information is transmitted over a communication channel. The use of code redundancy will increase the information certainty of the receiving system. Codes have most often been employed to satisfy the demands of the communication system. Codes are used to a great advantage in spread spectrum systems. A spread spectrum system is one that employs a great deal more bandwidth in transmitting its information than would normally be required. Error detecting and correcting codes for instance are often employed in spread spectrum systems on the data channel to protect the information from interference induced errors. Performing a correlation process in a spread spectrum receiver acts to overcome interference and thus to optimize the decoder. Spread spectrum systems of the direct sequence type are very similar to pulse code modulation (PCM) systems except the usual PCM codes are replaced by very long code sequences. There are various PCM codes which are described for example in "Digital Computer Technology and Design" Vol. II, Pages 12.26–12.27 by W. H. Ware, John Wiley and Sons, 1963. There are other reasons for encoding other than to protect the data sent.

The essential function of a receiver is to classify the infinity of possible received signals into a finite number of information messages. A decoder classifies a demodulator output sequence into a number of classes corresponding to the possible transmitted input messages. When the decoder attempts to correct the noise induced errors made by the demodulator this is usually interpreted as an error correction process. Error correction is possible when the received sequence of channel symbols contains redundancy. This is because only a fraction of the possible received sequence correspond to messages and the remainder indicate that certain types of errors have occurred. Further discussion of error correction is in "Principles of Data Communication" by R. W. Lucky, J. Salc and E. J. Weldon, Jr., McGraw-Hill, 1968, Chapter 10. Errors can also be handled in an entirely different manner. The receiver may decode a sequence only if it corresponds to an acceptable message sequence. Otherwise it will notify the transmitter that errors have occurred. This technique is generally considered to error detection.

With respect to the prior art of coding, error detection can be accomplished using code redundancy. If the set of valid codes is defined by a distance function then the degree of error detection can be defined. The "minimum distance" of a code is the smallest number of bits that any two coded words differ. A code is said to be error-detecting if its minimum distance is two or more. If the coding distance is three then any single error will change a valid code word into an invalid one which is a distance one away from the original coded word and a distance two from any other valid code word. Hence, in a code with minimum distance of three any single error is correctable or any double error detectable. Likewise, a code whose minimum distance is four may be used for either single error correction and double error detection or triple error detection.

Coding of information in the prior art has often been done for detecting and correcting errors. The use of long code sequences in a spread spectrum system has been to overcome interference or frequency jamming. It would be desirable to have an apparatus which employes coding such that it is not susceptible to noise, yet is capable of detecting interference from similar spectrum signals like its own. These are some of the problems this invention overcomes.

SUMMARY OF THE INVENTION

In accordance with an embodiment of this invention, code redundancy is employed when transmitting data over a shared medium. To detect the simultaneous transmission by multiple transmitters, a decoder in a receiver is adapted to sense interference by employing an apparatus which decodes only selected combinations of the canonical signal forms. Certain code sequences cannot be classified correctly since the number of bit errors in the sequence is greater than the minimum coding distance of the canonical signal forms. The decoder apparatus will not classify distorted signals into a decoded output state unless the code sequence received is error correctable. Code sequences which are not error correctable when processed by the decoder are used to generate an interference detection signal. The accuracy with which the decoder apparatus can detect interference is dependent on the signal attenuation characteristics and the out-of-phase correlation properties of the code sequences employed. The interference signal can be used to interrupt the transmitter of a modem or to control a plurality of remote transmitters. The interference signal can also be used to inhibit the receiver from generating erroneous data during the interference duration.

BRIEF DESCRIPTION OF THE DRAWINGS

FIG. 2 is a diagram using conventional integrated circuits that illustrates one possible implementation of an interference detecting decoder.

DESCRIPTION OF THE SPECIFIC EMBODIMENTS

Figure 1:
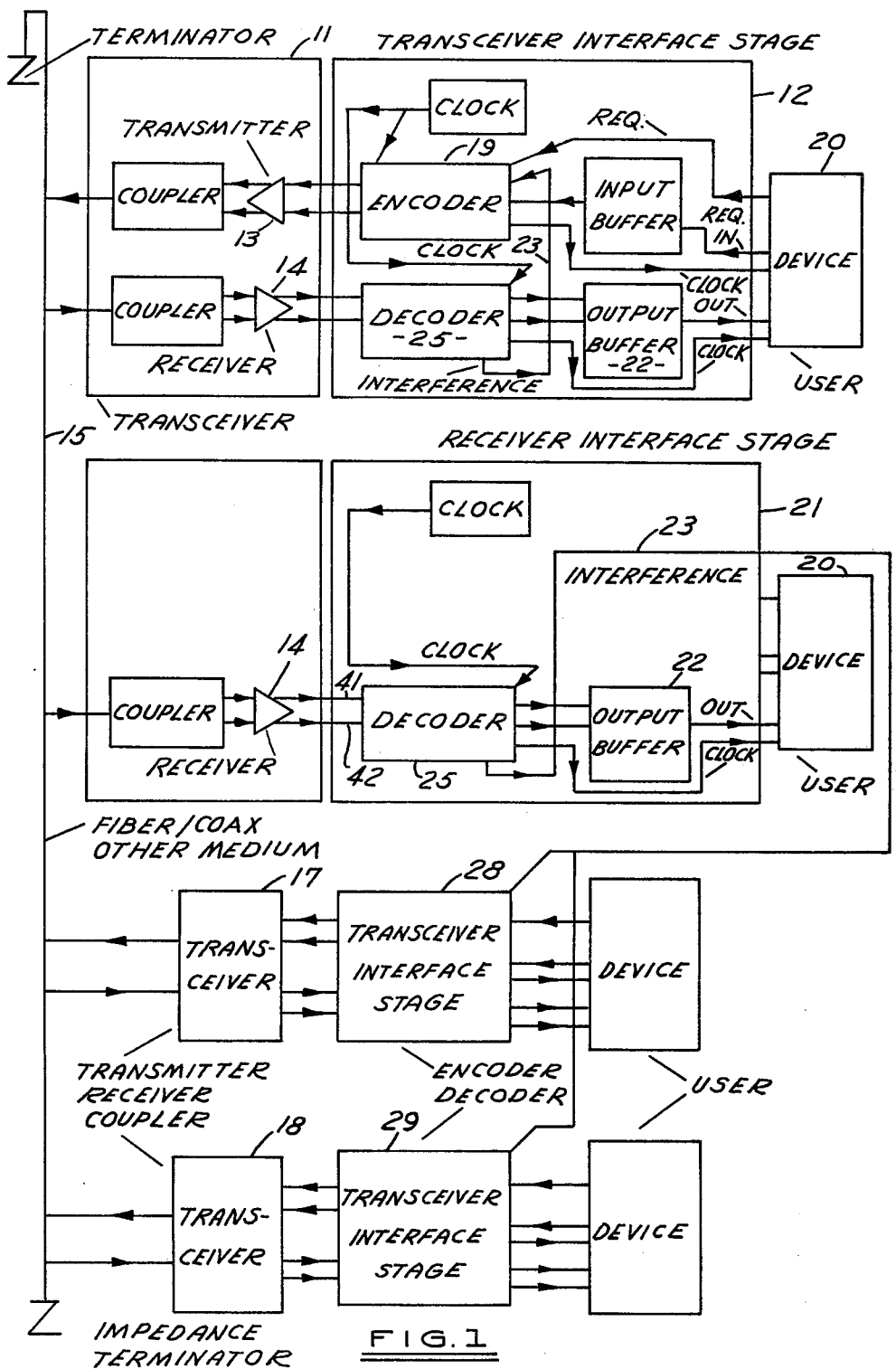
FIG. 1 is a block diagram of both a receiver and a modem which incorporates the apparatus for detecting interference which aids to control the transmission of a plurality of transceivers.

In reference to FIG. 1, the upper block diagram illustrates an implementation of a transceiver 11 and interface stage 12 of a data communication modem. The transceiver 11 contains a transmitter driver 13 and receiver amplifier stage 14 which are both coupled to a communication medium 15. The transceiver interface stage 12 has an encoder 19 which converts digital data from a computer or terminal device 20 into an encoded waveform required by the communication medium 15. The lower block diagrams of transceivers 17, 18 illustrate the shared access to the medium 15. The receiver interface stage 21 is coupled to a receiver which amplifies the signal on the communication medium 15. The output signals (on line 41, 42) of the amplifier are connected to a decoder 25.

The code redundancy in the received signal is processed by the code classifying decoder 25 which stores its output state in buffer register 22. The decoder apparatus 25 does not classify distorted signals into a decoded output state unless the code sequence received is error correctable. Code sequences, which are not error correctable since the number of bit errors in the sequence is greater than the minimum coding distance of the canonical forms, are used to generate an interference detection signal (on line 23). The interference signal 23 can be used to control a plurality of transmitters or transceiver interfaces 28, 29. The employment of a decoder 25 with interference detection within a modem or transceiver interface 12 can be used to disable an encoder 19 from transmitting when interference is present on medium 15. The interference signal 23 can also be used to inhibit the decoder 25 from generating erroneous data during the interference duration.

SELECTED IMPLEMENTATION

With the foregoing description of the invention, the following will describe one selected implementation of a decoder 25 which generates an interference signal 23. This description will be based on conventional integrated circuit devices as shown in FIG. 2. This implementation is concerned with a binary digital information decoder whose output format is either a "zero" or "one" state.

The encoding of binary information is done by employing a ternary code of run length six. With such code redundancy, it is possible to represent a total of 729 combinations. The selected canonical forms of a "zero" and "one" information element is represented by the sequences $+1,0,+1,-1,0,-1$ and $+1,+1,0,0,-1,-1$ respectively. Due to the minimum coding distance of these two canonical forms (necessary for error correction) it is possible to classify correctly 216 states as "one" and 216 states as "zero" of the total 729 combinations. The 297 code sequence which cannot be classified correctly are used as an interference detection signal.

Since the code sequence is ternary, it is first amplified by a differential amplifier (not shown) which separates the positive and negative signal elements. The positive output $F(+1)$ (on line 41) as well as the negative output $F(-1)$ (on line 42) from the amplifier are then processed by the decoder in FIG. 2. There are six ternary cells for each information bit transmitted. Two 6 bit serial shift registers 43, 44 are used to store the positive and negative cell elements in the received sequences. The input signals $F(+1)$ (on line 41) and $F(-1)$ (on line 42) are shifted through these shift registers 43, 44 by a synchronous 6x clock 45. The output from these shift registers are used as an address (on line 46) for a set of read-only memories (ROM) 47, 48. The address 46 itself reflects a binary code classification of the six ternary cells. The first ROM 47 has been programmed for a high output "B1" (on line 49) when the address corresponds to the 216 correct "one" states while the other ROM 48 the output "B0" (on line 50) corresponds to the 216 correct "zero" states. If neither output "B1" (on line 49) or "B0" (on line 50) is true, an interference signal "INTF" (on line 23) is generated. To synchronize the information bit rate to that of the code sequences being shifted through the registers 43, 44 a divide by 6 serial shift register 52 is employed. The starting of the shift register is accomplished by a "SYN" signal (on line 53). The "SYN" output (on line 53) from a gate 54 is generated when a "one" canonical form of $+1,+1,0,0,-1,-1$, is detected. This output (on line 53) is then used to set a flip-flop 55 which is the input (on line 51) to the divide by 6 shift register 52. The flip-flop 55 is reset after the first bit is shifted into the register 52. After 6 shifts the output (on line 59) is then used to clock flip-flop 55. The input (on line 23) to flip-flop 55 is the interference detection signal. The 6-bit shifting process is continued unless interference is detected. The divide by 6 output (on line 60) is then used to clock a flip-flop 56 which stores the current decoded output state (on line 57). This shift register 52 also supplies the serial output clock rate (on line 58) to the user device.

A data communication system suitable for use with this invention is further described in a copending application entitled "Communication Broadcast Channel Interface", Ser. No. 046,578, filed on even date herewith, assigned to the assignee of this application, the disclosure of which is hereby incorporated by reference.

Various modifications and variations will no doubt occur to those skilled in the various art to which this invention pertains. For example, the particular implementation of the concepts discussed above may be varied from that disclosed herein. These and all other variations which basically rely on the teachings through which this disclosure has advanced the art are properly considered with the scope of this invention as defined by the appended claims.

I claim:

1. A synchronous digital data communication receiver adapted to be connected to a communication medium shared by a plurality of other synchronous data communication receivers, said communication receiver having inputs for receiving a plurality of input signals representing input states, each input state being encoded with code redundancy into a unique one of a plurality of canonical forms transmitted over said communication medium, said digital data receiver comprising:

a first coupling means for providing an interfacing connection between said communication medium and said communication receiver;

a clock means for providing a train of pulses having a predetermined spacing;

a decoding means coupled to said clock means and said first coupling means for extracting signal information from input signals from said communication medium and providing a decoded output in one of a plurality of output states corresponding to said input states and classifying signals not of canonical form into one of the plurality of output states, such that said one of the plurality of output states has a minimum coding distance between the canonical forms and said input signals and said classified input signals represent an error of a correctable form, the number of said output states being equal to the number of said input states, said decoding means extracting signal information from the code redundancy of said input signals and generating as an output a contention interference detection signal, said contention interference detection signal being derived from unclassifiable ones of said input signals which have a coding distance which is equidistant from all canonical forms, and said unclassifiable input signals represent an error of a noncorrectable form, said decoding means including a means for detecting the presence of an error of a noncorrectible form, and said decoding means including a means for generating a signal identifying contention interference upon detection of an error of a noncorrectable form; and a second coupling means coupled to said decoding means for providing an interfacing buffer connection between said decoding means and a device using information received by said communication receiver.

2. A synchronous digital data communication receiver as recited in claim 1 wherein:

a first modem is coupled to the communication medium and to said decoding means for receiving said interference detection signal and for interrupting transmission on the communication medium in response to receipt of said interference detection signal in order to control access to said communication medium.

3. A synchronous digital data communication receiver as recited in claim 1 further comprising:

a plurality of modems, each coupled to said decoding means for receiving said interference detection signal and for interrupting transmission in response to receipt of the interference detection signal in order to control access of said modems to said communication medium.

4. A synchronous digital data communication receiver as recited in claim 1 wherein said decoding means includes:

buffer means for storing said signal information and providing as a first output said signal information;

a first preprogrammed memory coupled to said buffer means for storing a first state of a second output at addresses which are error correctible forms of a first canonical form and storing a second state of said second output at addresses which are error noncorrectible forms of said first canonical form;

a second preprogrammed memory coupled to said buffer means for storing a first state of a third output at addresses which are erroor correctable forms of a second canonical form and storing a second state of said third output at addresses which are error noncorrectible forms of said second canonical form;

an output means for producing said interference detector signal when said first and second programmed memories are not addressed to said first states of said second and third output states; and a synchronization means coupled to said buffer means for governing the bit information rate of said signal information so that said second and third outputs from said first and second programmed memories and said interference signal can be used for controlling the transfer of information from said decoder.

5. A synchronous digital data communication receiver as recited in claim 4 wherein:

said buffer means is a first and a second 6-bit shift register, wherein a first ternary state is stored in said first shift register, a second ternary state is stored in said second shift register and a third ternary state is stored in both said first and second shift registers.

* * * * *